United States Patent
Cooper et al.

(10) Patent No.: US 7,298,397 B2
(45) Date of Patent: Nov. 20, 2007

(54) DIGITAL TRANSMISSION SYSTEM

(75) Inventors: Alan Neal Cooper, Coppell, TX (US); Christopher Michael Fritz, Dallas, TX (US); James Walter Exner, Plano, TX (US)

(73) Assignee: Freestone Systems, Inc., Addison, TX (US)

( * ) Notice: Subject to any disclaimer, the term of this patent is extended or adjusted under 35 U.S.C. 154(b) by 833 days.

(21) Appl. No.: 10/202,968

(22) Filed: Jul. 24, 2002

(65) Prior Publication Data

US 2004/0017478 A1    Jan. 29, 2004

(51) Int. Cl.
*H04N 5/225*    (2006.01)

(52) U.S. Cl. .................................. 348/207.1

(58) Field of Classification Search ............ 348/207.1, 348/207.11, 211.99, 211.4, 211.14
See application file for complete search history.

(56) References Cited

U.S. PATENT DOCUMENTS

| | | | | |
|---|---|---|---|---|
| 4,584,656 A | * | 4/1986 | Sakai et al. | 348/297 |
| 4,780,761 A | * | 10/1988 | Daly et al. | 375/240.2 |
| 5,659,776 A | * | 8/1997 | Chauvel | 712/22 |
| 6,259,271 B1 | * | 7/2001 | Couts-Martin et al. | 326/40 |
| 6,381,007 B2 | * | 4/2002 | Fabre et al. | 348/298 |
| 6,825,876 B1 | * | 11/2004 | Easwar et al. | 348/234 |
| 2002/0051065 A1 | * | 5/2002 | Takahashi | 348/231 |
| 2002/0054222 A1 | * | 5/2002 | Nitta et al. | 348/231 |
| 2002/0126150 A1 | * | 9/2002 | Parry | 345/771 |

* cited by examiner

*Primary Examiner*—Tuan Ho
*Assistant Examiner*—Jason Whipkey
(74) *Attorney, Agent, or Firm*—Jackson Walker LLP; Robert C. Klinger

(57) ABSTRACT

The present invention provides a video transmission system that comprises a camera and a base unit. The camera includes a sensor memory adapted to store video data until each line of the video data is sequentially transmitted, a data buffer adapted to receive and store the sequentially transmitted video data until it is completely received at a base unit memory without errors, a data port adapted to receive from the data buffer and transmit to a camera physical transceiver the data buffered video data, a controller adapted to control data flow between the camera and the base unit, and the camera physical transceiver adapted to transfer the data buffered video data to a physical transceiver of the base unit. The base unit includes the base unit physical transceiver adapted to receive the transferred video data, a base unit data port adapted to receive from the base unit physical transceiver and transmit to a data buffer of the base unit, the transferred video data, a controller adapted to control data flow between the base unit and the camera, the base unit data buffer adapted to store the transferred video data from the base unit data port until it is completely received at the base unit physical transceiver without errors, and the base unit memory adapted to receive and sequentially store each line of the transferred video data.

22 Claims, 8 Drawing Sheets

Note: Alarm (CALL) data is sent as bit 7 of LC1

Note: Remote data is sent as bit 0 of SY0

DIGITAL TRANSMISSION SYSTEM

RELATED APPLICATIONS

The present invention is related to patent application Ser. No. 10/202,283 titled DIGITAL OBSERVATION SYSTEM, to patent application Ser. No. 10/202,668 titled DIGITAL CAMERA SYNCHRONIZATION, and to patent application Ser. No. 10/202,257 titled UNIVERSAL SERIAL BUS DISPLAY UNIT. These applications are commonly assigned, commonly filed, and are incorporated by reference herein.

FIELD OF THE INVENTION

The present invention relates to data transmission systems and, more particularly, to a protocol and transmission system enabling data to be transmitted between a camera and a base unit through a digital lossless process.

BACKGROUND OF THE INVENTION

There are requirements to transmit video information from a video source such as a video camera to another unit such as a video display through a lossless process so that the data received is an exact representation of the data transmitted. Conventional solutions exist such as Wide Area Network protocols to address these requirements but they typically are not optimized for the multitude of boundary conditions that are specific to the system and the consideration of a cost of the associated implementation. To overcome this limitation, an improved system that could move data in a format that is native to the source of the data with a high overhead efficiency to minimize the magnitude and cost of the system and to enhance the performance through a streamlined system can be developed. In such a system, a video camera is utilized which outputs a standard National Television Standards Committee (NTSC) square pixel format which has an inherent data rate of 12.5 Mega Pixels per second (Mps). The most typical mode of transmission of this type of data would be to convert the camera Red Green Blue (RGB) color space to a YUV color space. YUV is a format that represents the signal as luminance and chrominance information and is a widely used video format for the transmission of digital video data. The video camera sensor's RGB data however, tends to be approximately 1.5 to 3 times less of a data amount as the YUV format. The reason for this disparity is that the camera sensor data is an efficient method of sampling a scene in which to extract YUV information. By taking advantage of the data in its original form and transmitting it before the color space transformation, a data reduction of 1.5 to 3 times can be achieved. This is a critical issue during NTSC square pixel video signal transmission. The amount of data required to transmit the data in the YUV domain is approximately 150 Mega bits per second (Mbs) which exceeds the capability of Ethernet systems that typically transmit data at 100 Mbs. Therefore, if the data could be transmitted in the camera sensor's original RGB format, the data requirements could be reduced from approximately 150 Mbs to 75 Mbs. As such, the data could be transmitted using the standard, low cost, 100 Mbs transmission method.

Another limitation involves the utilization of the Ethernet protocol for the standard transmission method for 100 Mb data. In such a utilization, the resultant true data output would be far less than 75 Mbs because the Ethernet protocol has multiple operational requirements such as multi-drop operation, error detection, source and destination addressing, and multi-speed operation. In the aforementioned improved system, many of these requirements are not needed. Therefore, these operational requirements can be removed to increase the efficiency of the transmission. However, the video camera data includes unique requirements such as data transmission response latencies to be addressed above normal Ethernet needs. As such, requirements to add additional functions with a minimum penalty to the transmission efficiency exist.

Therefore, it is desirable for the present invention to overcome the conventional limitations associated with transmitting data between a video camera and a base unit.

SUMMARY OF THE INVENTION

The present invention achieves technical advantages as a system and method for transmitting video data between a video camera and a base unit via a communication protocol that is compliant with Ethernet physical drivers for transmitting and receiving data at 100 Mbs. The system and protocol can further transmit digital camera data in the camera sensor's original RGB format at the rate of 12.5 Mps or 75 Mbs (using the standard 100 Mbs transmission method). The protocol is designed to handle bi-directional communication channels along with methods for transmission validation and retry of transmissions for lost data packets. The protocol has a reduced overhead designed to maximize data throughput and retain compatibility with standard Ethernet physical drivers.

In an exemplary embodiment, a video transmission system comprises a camera and a base unit. The camera includes a sensor memory adapted to store video data until each line of the video data is sequentially transmitted, a data buffer adapted to receive and store the sequentially transmitted video data until it is completely received at a base unit memory without errors, a data port adapted to receive from the data buffer and transmit to a camera physical transceiver the data buffered video data, a controller adapted to control data flow between the camera and the base unit, and the camera physical transceiver adapted to transfer the data buffered video data to a physical transceiver of the base unit. The base unit includes the base unit physical transceiver adapted to receive the transferred video data, a base unit data port adapted to receive from the base unit physical transceiver and transmit to a data buffer of the base unit, the transferred video data, a controller adapted to control data flow between the base unit and the camera, the base unit data buffer adapted to store the transferred video data from the base unit data port until it is completely received at the base unit physical transceiver without errors, and the base unit memory adapted to receive and sequentially store each line of the transferred video data.

DETAILED DESCRIPTION OF THE INVENTION

Figure 1:
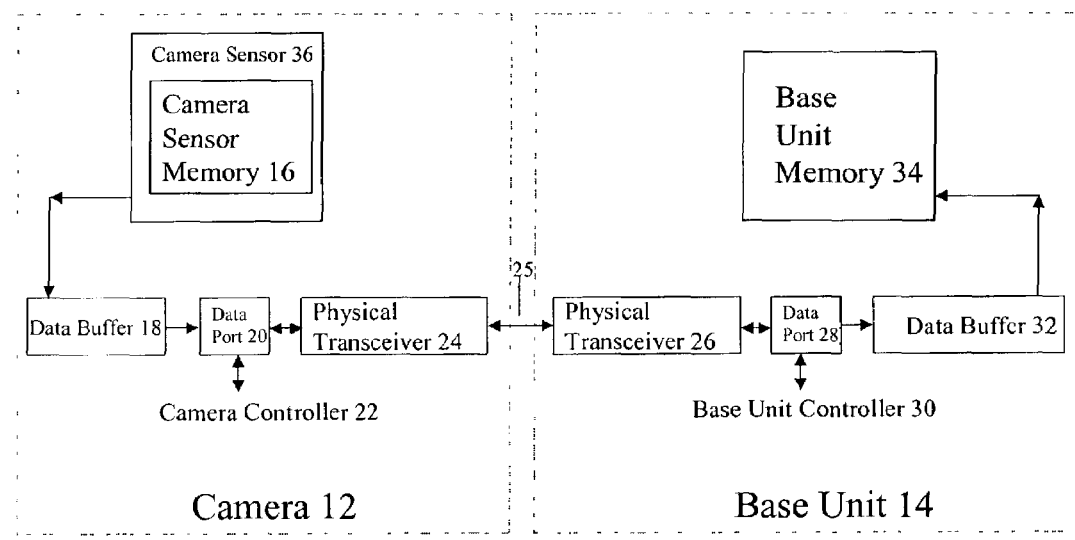
FIG. 1 illustrates a block diagram of a video transmission system in accordance with an exemplary embodiment of the present invention.

Referring now to FIG. 1, a video transmission system 10 of the present invention is presented. The system 10 includes at least one camera 12 and at least one base unit 14. The camera 12 comprises a sensor memory 16 adapted to store video data until each line of the stored video data is sequentially transmitted and, after some image specific processing such as Correlated Double Sampling and DC Restoration, a data buffer 18 adapted to receive and store the sequentially transmitted video data until it is completely received at a base unit memory 34 without errors. The data buffer 18, which is operably coupled to the camera sensor 36 to receive data from the camera sensor memory 16, is utilized because the readout of the stored video data from the sensor memory is typically a destructive read. The camera 12 further comprises a data port 20, operably coupled to the data buffer 18, that is adapted to simultaneously transmit and receive video and non-video data and transmit the data to the base unit 14, and a controller 22 adapted to control data flow between the camera and the base unit. A camera physical transceiver 24 is also adapted to simultaneously transmit/transfer (and receive) the video data stored in the data buffer 18 and the non-video data to a base unit physical transceiver 26, where the controller 22 and the camera physical transceiver 24 are operably coupled to the data port 20.

In a preferred embodiment, the data output to the camera physical transceiver 24 has a peak data rate of 12.5 Mega Bytes per second (MBs) or 100 Mbs. The average data rate is (640 pixels)×(480 lines)×(1 Byte)×(30 Frames per second)=9.216 MBs or 73.728 Mbs. The data output from the camera 12 during each transmission is equal to one line of the camera sensor 36 that is 640 pixels long. As such, each data packet sent from the camera 12 to the base unit 14 is 640 bytes or 5120 bits of data. The data rate for the transmission is the standard Ethernet 100BaseT rate of 100 Mbs and the transmission time for transmitting the 640 bytes of video data is 51.2 uS which does not include additional data used for error correction, secondary data, and header data. The physical transceivers 24 and 26 are Ethernet 100BaseT transceivers and are adapted to transmit and receive data simultaneously. The physical drivers could be other devices dependant on the data speeds required.

The base unit 14 includes the base unit physical transceiver 26 which is adapted to simultaneously receive and transmit the video data and the non-video data from the data port 20 via the camera physical transceiver 24 (and receive and transmit other data to the camera 12 from the data buffer 32 and/or the base unit memory 34). The base unit physical transceiver 26 and the camera physical transceiver 24 are operably coupled to each other via an Ethernet connection 25. The base unit 14 further includes a data port 28, operably coupled to the base unit physical transceiver 26, that is adapted to simultaneously transmit and receive video and non-video data and transmit the data to the camera 12, a controller 30 adapted to control data flow between the base unit 14 and the camera 12, and a data buffer 32 adapted to store the video data from the base unit physical transceiver 26 and the data port 28 until it is completely received at the base unit physical transceiver without errors. The data buffer 32 and the controller 30 are operably coupled to the data port 28. The base unit memory 34, operably coupled to the data buffer 32, is adapted to sequentially store each line of the video data (i.e. the complete frame of the transmitted video data). The base unit memory 34 stores the last complete transferred frame of data for the base unit 14 to display. The image in the memory 34 will be retained until a new frame of video is received and stored.

In a preferred embodiment, the camera 12 further comprises a camera sensor 36, which comprises the sensor memory 16, and an A/D converter (not shown). Initial video data and/or previous video data is sequentially transmitted from the sensor memory 16 in RGB color space format native to the camera sensor 36 in, for example, a single serial stream at 12.5 Mps. The A/D converter, which interfaces to the sensor memory 16 and the camera data buffer 18, is adapted to convert the previous video data from RGB analog data to RGB digital data. The RGB digital data is then transmitted to and stored in the camera data buffer 18. The camera sensor 36 may output analog data which is converted to digital data via the A/D converter that is external to the camera sensor 36. Additionally, the camera sensor 36 may internally include the A/D converter and thus directly output digital data. The video data is sent as digital data between the camera 12 and the base unit 14.

In an alternate embodiment, the camera 12 further comprises a programmable logic device (PLD—not shown). The PLD, which interfaces to the A/D converter and the data buffer 18, is adapted to convert digital data from one format of color space to another format of color space entirely in the digital domain. As such, the camera sensor 16 outputs RGB analog data, the A/D converter converts the RGB analog data to RGB digital data, the PLD converts the RGB digital data in RGB color space format to YUV digital data in YUV color space format, which is transferred to the data buffer 18. The PLD further controls the timing signals of the camera sensor 36 and the A/D converter to move the analog data/previous video data out of the camera sensor memory 16, through the A/D converter, into the data buffer 18, and then to the camera physical transceiver 24 via the data port 20.

The base unit physical transceiver 26 is adapted to transmit an acknowledgement to the camera physical transceiver 24 after each line of the video data is received without errors from the camera physical transceiver. The base unit controller 30 is adapted to confirm to the base unit physical transceiver 26 via the data port 28 that each line of the video data was received without errors. The sensor memory 16 is then adapted to increment to a next line of the video data to be transmitted when the acknowledgement is received by the camera controller 22. The camera data buffer 18 is adapted to retransmit the line of the video data when the acknowledgement is not received by the camera controller 22 within an amount of time.

In a preferred embodiment of the present invention, a video transmission system comprises a camera including: a sensor memory adapted to store previous video data; a sensor adapted to sequentially transmit the previous video data as RGB analog data, where the camera sensor comprises the sensor memory; an A/D converter adapted to convert the RGB analog data into RGB digital data and transmit the RGB digital data to a data buffer, where the A/D converter interfaces to the sensor and the data buffer; where the data buffer is adapted to receive and store the RGB digital data until it is completely received at a base unit memory without errors, where the data buffer is operably coupled to the sensor memory; and a camera physical transceiver adapted to transmit the stored RGB digital data to a base unit physical transceiver, where the camera physical transceiver is operably coupled to the data buffer via a data port. The video transmission system further comprises the base unit that includes: the base unit physical transceiver adapted to receive the transmitted RGB digital data from the camera physical transceiver, where the base unit physical transceiver is operably coupled to the camera physical transceiver; a data buffer adapted to store the received RGB digital data from the base unit physical transceiver until it is completely received at the base unit physical transceiver without errors, where the data buffer is operably coupled to the base unit physical transceiver via a data port; and the base unit memory adapted to sequentially store each line of the received RGB digital data, where the base unit memory is operably coupled to the data buffer. The sensor memory is further adapted to delete the stored previous video data when each line of the stored previous video data is sequentially transmitted and the camera data buffer is adapted to delete the RGB digital data when it is completely received at the base unit memory without errors.

In another embodiment of the present invention, a video transmission system comprises a destination (such as, for example, the base unit 14) and a camera (such as, for example, the camera 12) that includes a camera memory that is adapted to: store a frame of video data until each line of the frame is transmitted to and received at the destination, read a next line of the frame when a previous line is received at the destination, and read the next line of the frame upon receiving an acknowledgement of the previous line transmission. The destination includes: a destination memory adapted to store a last complete received frame of the video data from the camera memory, and a display adapted to receive and display the last complete received frame of the video data. The camera memory is further adapted to delete the previous line when the next line is read.

In a further embodiment of the present invention, a video transmission system comprises a camera including a sensor memory adapted to store previous video data, a sensor adapted to sequentially transmit the previous video data in RGB color space format native to the camera sensor, where the camera sensor comprises the sensor memory, and a PLD adapted to convert the sequentially transmitted previous video data into YUV color space format and transmit the YUV data to a data buffer, where the data buffer is adapted to receive and store the YUV data until it is completely received at a base unit memory without errors, and where the data buffer is operably coupled to the sensor memory, and a camera physical transceiver adapted to transmit the stored YUV data to a base unit physical transceiver, where the camera physical transceiver is operably coupled to the data buffer via a data port.

The video transmission system further comprises the base unit that includes the base unit physical transceiver adapted to receive the transmitted YUV data from the camera physical transceiver, where the base unit physical transceiver is operably coupled to the camera physical transceiver, a data buffer adapted to store the received YUV data from the base unit physical transceiver until it is completely received at the base unit physical transceiver without errors, where the data buffer is operably coupled to the base unit physical transceiver via a data port, and the base unit memory adapted to sequentially store each line of the received YUV data, where the base unit memory is operably coupled to the data buffer. The sensor memory is adapted to delete the stored previous video data when each line of the stored previous video data is sequentially transmitted and the camera data buffer is adapted to delete the YUV data when it is completely received at the base unit memory without errors.

In a preferred embodiment of the present invention, a camera comprises a memory adapted to store previous video data; a first module (such as, for example, the sensor 36) adapted to sequentially transmit the previous video data in an analog format, where the first module comprises the memory; a converter adapted to convert the sequentially transmitted previous video data in analog format into a digital format and transmit the digital format data to a second module (such as, for example, the data buffer 18), where the converter interfaces to the memory and the second module; where the second module is adapted to receive and store the digital format data until it is completely received at a destination without errors, where the second module is operably coupled to the memory; and a third module (such as, for example, the camera physical transceiver 24) adapted to transmit the stored digital format data to the destination, where the third module is operably coupled to the second module via a port.

In another embodiment of the present invention, a camera comprises a sensor memory adapted to store one of a plurality of frames of video data until each line of the one frame is transmitted to and received at a destination, where the sensor memory is adapted to read a next line of the one frame when a previous line is received at the destination, a data buffer adapted to receive the plurality of frames and store them until they are completely received at the destination without errors, where the data buffer is operably coupled to the sensor memory and a data port, and a physical transceiver adapted to transmit the frames to the destination, where the physical transceiver is operably coupled to the data port. The sensor memory is adapted to: delete the previous line when it is received at the destination and to store a next frame of the plurality of frames of video data when each line of the one frame is received at the destination.

In another embodiment of the present invention, a camera comprises a memory adapted to store previous video data, a first module adapted to sequentially transmit the previous video data in a first color space format native to the first module, wherein the first module comprises the memory, a programmable device adapted to convert the sequentially transmitted previous video data into a second color space format and transmit the second color space format data to a second module, wherein the device interfaces to the memory and the second module, where the second module is adapted to receive and store the second color space format data until it is completely received at a destination without errors, and where the second module is operably coupled to the memory, and a third module adapted to transmit the stored second color space format data to the destination, where the third module is operably coupled to the second module via a port.

In a further embodiment of the present invention, a base unit comprises an input adapted to receive each line of a first frame of video data sent from a source, a data port adapted to transmit and receive non-video data to and from the source, where the input is operably coupled to the data port, a data buffer adapted to store the first frame and all subsequently received frames until the frames are completely received at the input without errors, where the data buffer is operably coupled to the data port and a receiver memory, and where the errors occur when the frames are not received within an amount of time, where the receiver memory is adapted to store the frames and the non-video data. The base unit further includes a display adapted to display the frames, where the display is operably coupled to the receiver memory.

Figure 2:
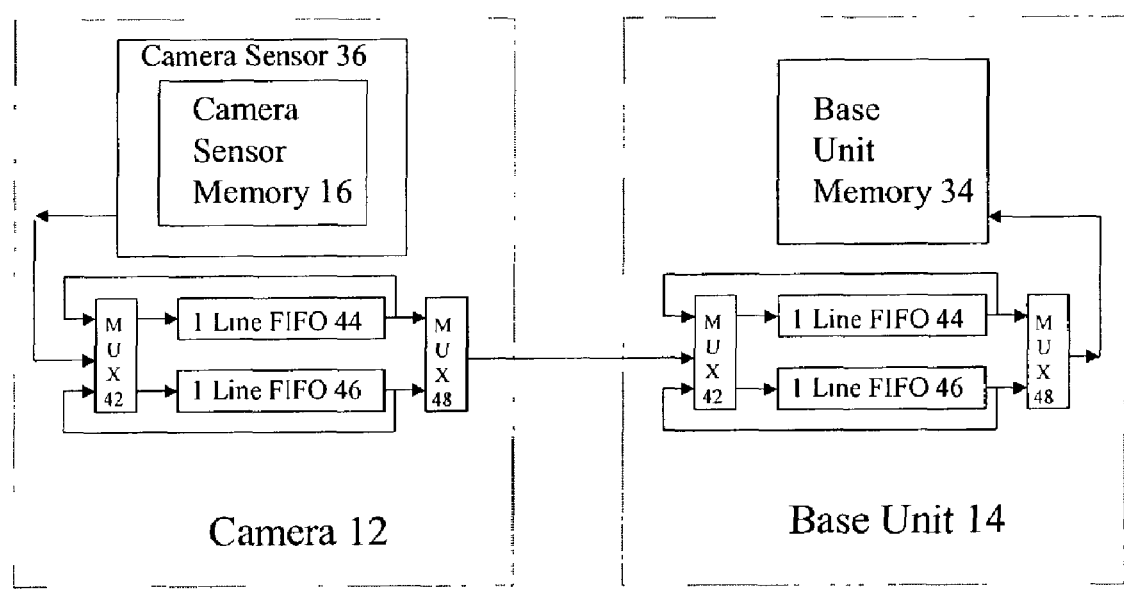
FIG. 2 illustrates a block diagram of a video transmission path between a camera and a base unit each comprising a two video line FIFO memory in accordance with an exemplary embodiment of the present invention.

Referring now to FIG. 2, a two video line first-in-first-out (FIFO) memory 40 contained in the data buffers 18 and 32 is depicted. The memory 40 includes an input multiplexer 42 that receives the video data (in the camera sensor memory 16) from the camera sensor 16, a first one line FIFO memory 44, a second one line FIFO memory 46, and an output multiplexer 48 that outputs the data to the data port 20. The input multiplexer 42 and the output multiplexer 48 are operably coupled to each other and to the one line FIFO memories 44 and 46. The input multiplexer 42 selects the appropriate data to be input to each of the memories 44 and 46. The first one line FIFO memory 44 is adapted to receive and store the video data and the second one line FIFO memory 46 is adapted to store the line of the video data to be retransmitted (i.e. it receives its own re-circulated output so the data can be resent if the transmission to the base unit 14 is unsuccessful). The output multiplexer 48 controls the data output from the memories 44 and 46 and selects one of memories' data to output to the physical transceiver 24 via the data port 20. The data output is either the latest line stored or a retransmission of the last unsuccessful transmission.

The receiving data buffer 32 at the base unit 14 performs a similar operation in storing the new line being transmitted and outputting the last complete line. When a video line of data is successfully transmitted, the mulitplexers on the receiver will increment to enable the new line of data to be written over the line memory that has already output its data to the base unit memory 34, and the other line of data will be transferred to the base unit memory.

Figure 3:
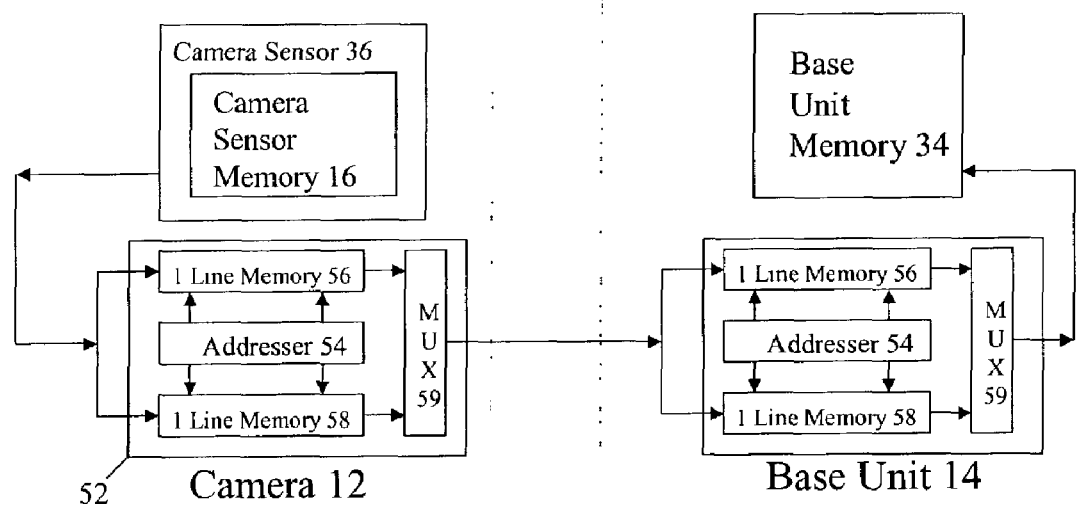
FIG. 3 illustrates a block diagram of a video transmission path between a camera and a base unit each comprising a RAM module in accordance with an exemplary embodiment of the present invention.

In a further embodiment of the present invention, the line memories can be implemented in RAM modules 52 where the input data multiplexing is controlled by an addresser 54 performing memory addressing as shown in FIG. 3. The RAM modules 52 contain enough memory to hold two lines of data. In the camera 12, the RAM module's 52 memory 56 or 58 outputs data to the physical receiver 24 through the multiplexer 59 and the data port 20, while the other memory (opposite of the one outputting) receives new video data from the camera sensor memory 16. In the base unit 14, one half of the two line RAM memory 56 or 58 receives the new video data from the physical receiver 26 through the multiplexer 59 and the data port 28, while the other half (opposite of the one receiving) is used for transmitting the last completely received line to the base unit memory 34.

Transmission timing is an important aspect of the video transmission system 10. The communication protocol of the system 10 should allow time for the initial data transmission to reach the base unit 14, time for the base unit to check the data and send an acknowledgement, time for the acknowledgement to travel to the camera 12, and time for the camera to verify the acknowledgement. The travel time for the transmission of the data and the acknowledgement response time is a variable that is dependant on the length of the connection 25 and the type of connection. In a preferred embodiment of the present invention, the connection 25 comprises a CAT5 cable and thus the characteristics of the cable are fixed. The maximum travel time is calculated by determining the maximum length of cable allowable and the time period associated with it. As such, the system 10 utilizes a fixed period of time allowed for the data transmission travel and acknowledgement of the data received before the next line of data is transmitted. The "line time" as described above is 64 uS for the total time which is the period between each line transmission and is the total available time for the transmission and acknowledgement of data from the camera 12. The total data packet transmitted is 654 bytes resulting in a 52.32 uS transmission time. The total packet transmitted from the base unit 14 to the camera 12 is 14 bytes resulting in a 1.12 uS transmission time. Therefore, the transmission of data takes a total of 52.32+1.12 uS=53.44 uS out of the 64 uS. This leaves 64−53.44=9.56 uS for data travel time and processing time. In a preferred embodiment of the present invention, the system operates up to 3000 feet which requires approximately 3000×1.12 ns=6.7 uS for the travel time. This leaves approximately 3 uS for the system 10 to start and process any transmissions within the 64 uS.

As described above, if the acknowledgement of the transmission is not received at the camera 12 and processed within one line time, the camera 12 will retransmit the same line of data. The camera sensor 36 is a destructive read process—once the data is read from the sensor the data cannot be reconstructed. Since the data may need to be transmitted multiple times, it is required to store the data in the memory 40. Furthermore, the timing of the input of the data into the memory 40 and the output of the data are such that the two memories 44 and 46 are required if data from the sensor 36 is required to be input into the memory 40 before the old data is read out. This requirement is dependant on the cameras time base design (not shown but described more fully in patent application Ser. No. 10/202,283 titled DIGITAL OBSERVATION SYSTEM which is incorporated by reference herein). In this implementation, the memories 44 and 46 are used in an alternating fashion. One memory is used for writing data from the sensor 36 while the other memory is read out. Each of the memory elements in this implementation was sized at 640×8 bits.

The camera sensor memory 16 holds one frame of data that is equal to 480 lines of video data and stores the data until each of the lines are successfully transmitted to the base unit 14. As described earlier, when the line transmitted is not acknowledged by the base unit 14, the camera 12 will retransmit the same line. In this situation, a new line is not read from the memory 16 until the line is successfully transmitted to the base unit 14. Similarly to the line time, however, a finite time exists for the transmission of all of the data contained in the memory 16. In a preferred embodiment of the present invention, the system 10 is designed to transmit 30 frames of the memory 16 per second. This allows 33.33 mS for each frame to be transmitted. Since the memory 16 holds 480 lines and each line is allocated 64 uS for transmission then the total time for transmission without errors is 480×64 uS=30.72 mS. This leaves approximately 2.6 mS for line retransmissions. Since each retransmission is 64 uS, then 2.6 mS/64 uS=40 lines of data that can be retransmitted. If all of the time leftover is for retransmission, however, other processes are required in the time-base which use some of this allotted time. In a preferred embodiment of the present invention, approximately 20 lines are available for retransmission. This results in the ability to successfully transmit a frame of the camera sensor 36 with between approximately 5% and 8% of the lines unsuccessfully transmitted.

In addition to retransmissions, error checking and correction are further aspects of the video transmission system 10. Error control is achieved through the use of a 16-bit Cyclic Redundancy Check (CRC) which is added to the end of a data transmission between the camera 12 and the base unit 14. This CRC is calculated on all the data transmitted in one line period except for the preamble. If the CRC calculation of the received data at the base unit 14 is correct, the receiver will send the acknowledgement back to the camera 12 through a 14-byte transmission that includes the 16-bit CRC. If the camera 12 receives the 14-byte acknowledgement and the CRC calculation is correct, the camera will increment to send the next line of data at the start of the next line time and will send the line number of the line that is being transmitted to the base unit 14 to identify the transmitted line. This enables the base unit 14 to verify that the camera 12 received its acknowledgement and the next line was transmitted.

When the data is received by the base unit 14, the CRC check is placed at the end of the transmission which requires the base unit to store the full line of transmitted data before it is informed that the data is error free. To make optimal use of time, the data stored from the last successful transmission is transferred into the base unit memory 34 from the data buffer 32 at approximately the same time that the next line of data is being transmitted to the base unit 14. As such, the base unit 14 includes two lines of data storage capability to receive data at the same time the last valid line of data is transferred to the base unit memory 34.

Figure 4A:
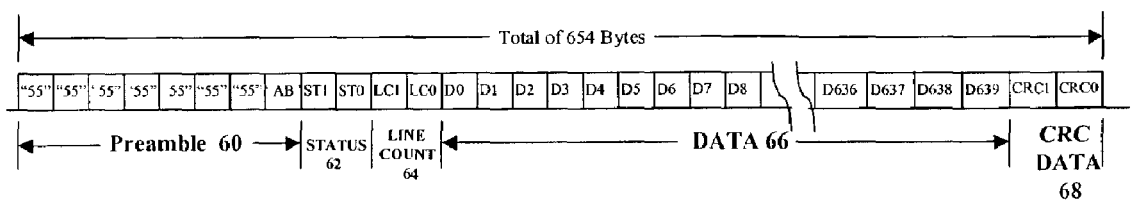
FIG. 4a illustrates a block diagram of a data transmission from a camera to a base unit in accordance with an exemplary embodiment of the present invention.

Referring now to FIG. 4*a*, a diagram of a data transmission protocol from the camera 12 to the base unit 14 is displayed. To transmit over an Ethernet 100BaseT physical driver, multiple signals are required to control the flow of the data. In a preferred embodiment of the present invention, these signals are generated by the time-base of the camera 12 and the base unit 14 accordingly and comply with the physical drivers requirements. The data signal has specific requirements for certain aspects of the start and end of the transmission to allow the physical driver to implement certain control signals in the protocol for signaling the receiving unit the start and stop locations of the data. The data includes a preamble of a specified length with specified values to alert the driver of the location of the data starting position. Beyond this point, the data can be of any form until the driver is notified through control signals that the last of the data has been input into the driver. The CRC data is placed at the end of the data stream so that the error checking verifies all of the data transmitted and for ease of calculation.

The first 8 bytes of data comprise the preamble 60, of which the first 7 bytes have a value of "55" in hex and the last byte has a value of "AB" in hex. These values, which are set by the Ethernet standard, let the receiver know when new data is coming and the actual start location of the first byte of data. The next two bytes, "ST1" and "ST0," are status data 62 which are reserved for the camera 12 to send non-video data to the base unit 14. This data can be predetermined by the camera 12 or be requested data by the base unit 14. The two bytes following the status data contain the line count 64. The most significant of the bytes is designated "LC1" and is transmitted first. The least significant byte is designated "LC0" and is transmitted after "LC1." In a preferred embodiment, 480 lines are transmitted requiring 9 bits of data. The remaining 7 bits of data not required for the count could also be used for other purposes such as camera status data. Following the line count 66, the video data bytes 66 are transmitted. The video data bytes 66 are designated as "D0" through "D639" for a total of 640 bytes of video data. Following the video data, two CRC bytes 68 are transmitted with the most significant byte ("CRC1") transmitted first and the least significant byte ("CRC0") transmitted next. The total count of bytes transmitted including the preamble is 654.

Figure 4B:
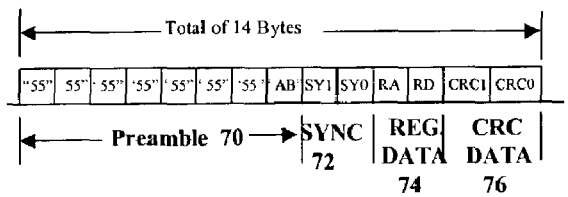
FIG. 4b illustrates a block diagram of a data transmission from a base unit to a camera in accordance with an exemplary embodiment of the present invention.

Referring now to FIG. 4*b*, a block diagram of a data transmission protocol from the base unit 14 to the camera 12 is illustrated. The base unit protocol contains the same 8 bytes of preamble as the camera's 12 transmission. The two bytes following the base unit protocol's preamble 70 are the sync bytes 72 which contain information describing the type of data that is sent. The first byte is "SY1" and has a value of "0F" when acknowledging a line is received, or a value of "A5" to reset the camera 12 to the start of a new frame. The second byte is "SY0" which contains data to be sent from the base unit 14 to the camera 12 that is not required to be received by the camera's registers. Typically this is used for quick data transmissions. Following the sync bytes 72 are register data bytes 74 for sending data to the camera registers which are used to change the operation of the camera 12 or to send data to the camera. The first byte transmitted is an "RA" byte that contains the address of the register to which the data is to be sent. The second byte is the "RD" byte that contains the data that is loaded into the register at the camera 12. Following the "RD" byte are the two CRC bytes 76 that operate in a similar manner as the CRC bytes in the camera transmission.

This protocol provides a high efficiency of bandwidth and a deterministic time period for each transmission thus enabling the camera 12 and the base unit 14 to operate in a fixed time-base of operation. This is very important in video applications where the frame rate of video needs to be consistent for a user to perceive the data as continuous. The system is also robust in that errors are corrected and any failures in transmission do not corrupt the video data to the display.

Figure 5:
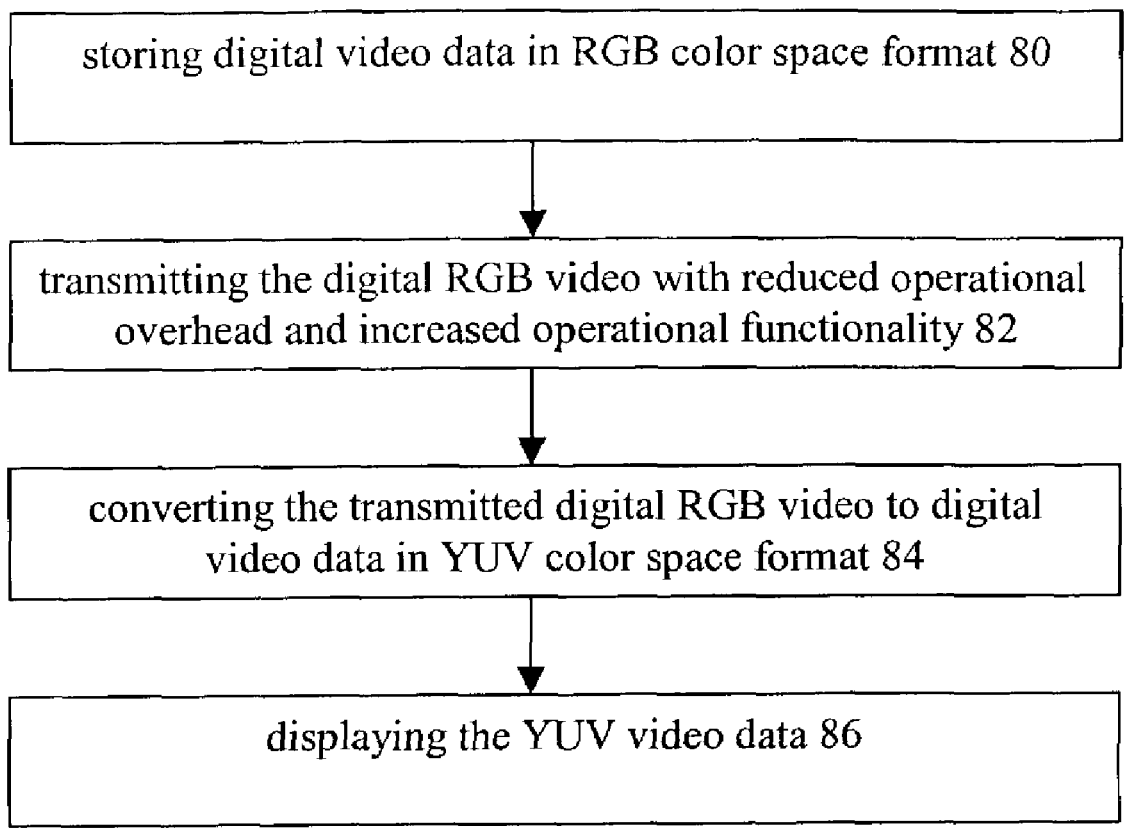
FIG. 5 illustrates a flow chart for video data transmission from a camera to a display in accordance with an exemplary embodiment of the present invention.

Referring now to FIG. 5, a method for video data transmission from a camera to a display is presented. The method begins at steps 80 and 82, respectively, with the storing of digital video data in RGB color space format and the transmitting of the digital RGB video with reduced operational overhead and increased operational functionality. The method proceeds to step 84 with the converting of the transmitted digital RGB video to digital video data in YUV color space format, and, at step 86, the displaying of the YUV video data. The operational overhead includes at least one item from a group consisting of: a multi-drop operation, error detection, source addressing, destination addressing, and multi-speed operation, and the operational functionality includes at least one item from a group consisting of: header data, secondary data, and error correction.

Figure 6:
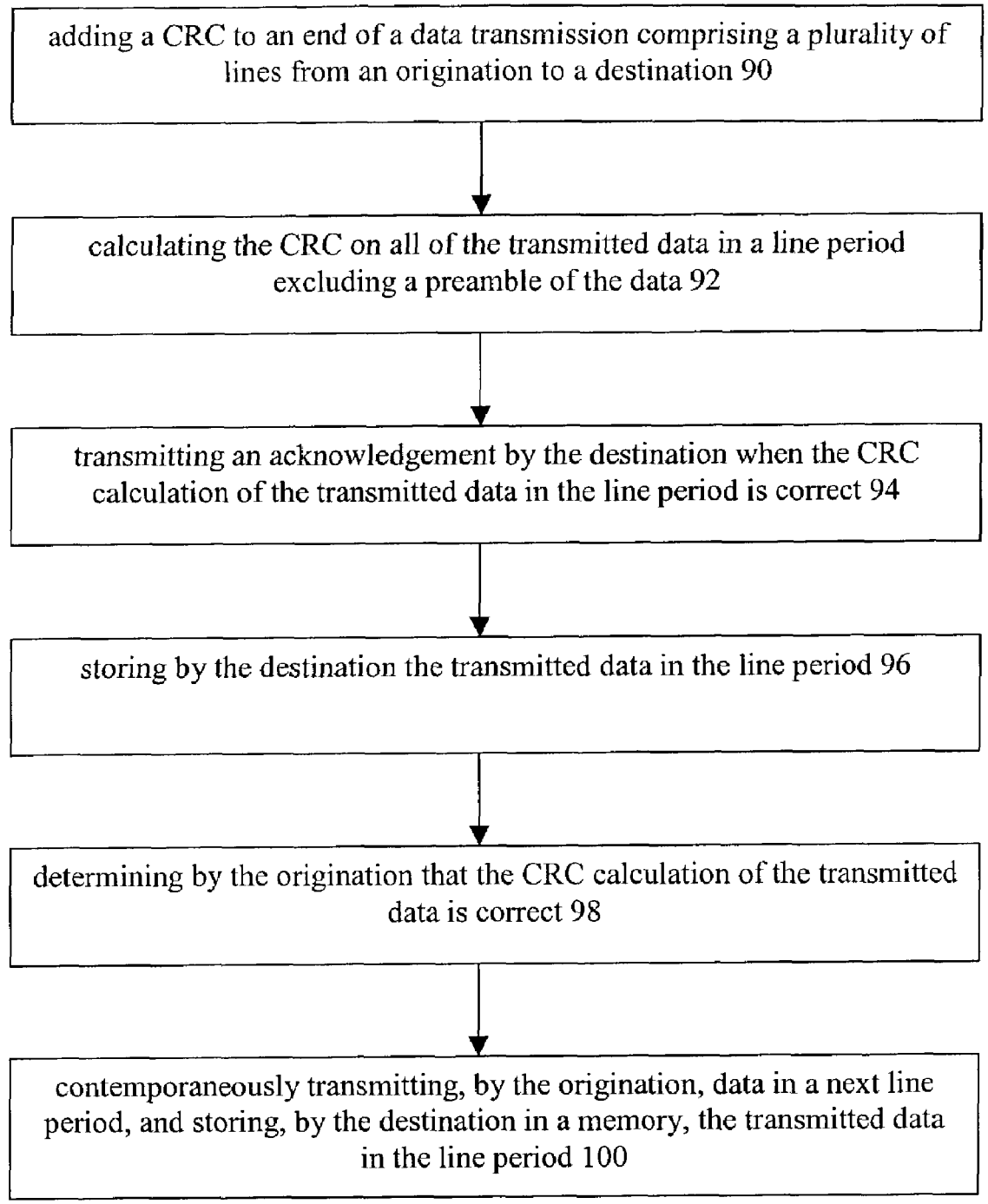
FIG. 6 illustrates a flow chart for data transmission error control in accordance with an exemplary embodiment of the present invention.

Referring now to FIG. 6, a method for data transmission error control is disclosed. The method begins at step 90 with the adding of a cyclic redundancy check (CRC) to an end of a data transmission comprising a plurality of data bytes from an origination to a destination. Calculating the CRC on all of the transmitted data in a line period excluding a preamble of the data, and transmitting an acknowledgement by the destination when the CRC calculation of the transmitted data in the line period is correct occur, respectively at steps 92 and 94. The acknowledgement includes the CRC located at the end of the acknowledgement. The method proceeds to step 96, where the transmitted data in the line period is stored by the destination, and to step 98 where the origination determines that the CRC calculation of the transmitted data is correct. At step 100, transmitting by the origination data in a next line period, and storing by the destination in a memory the transmitted data in the line period contemporaneously occur. The data comprises the CRC at an end of the data transmission of the next line period. The method further includes additional steps such as transmitting a line period number to the destination, determining the reception of the acknowledgement and the transmission of the next line based on the line period number, and storing the transmitted data in the next line period by the destination.

Figure 7:
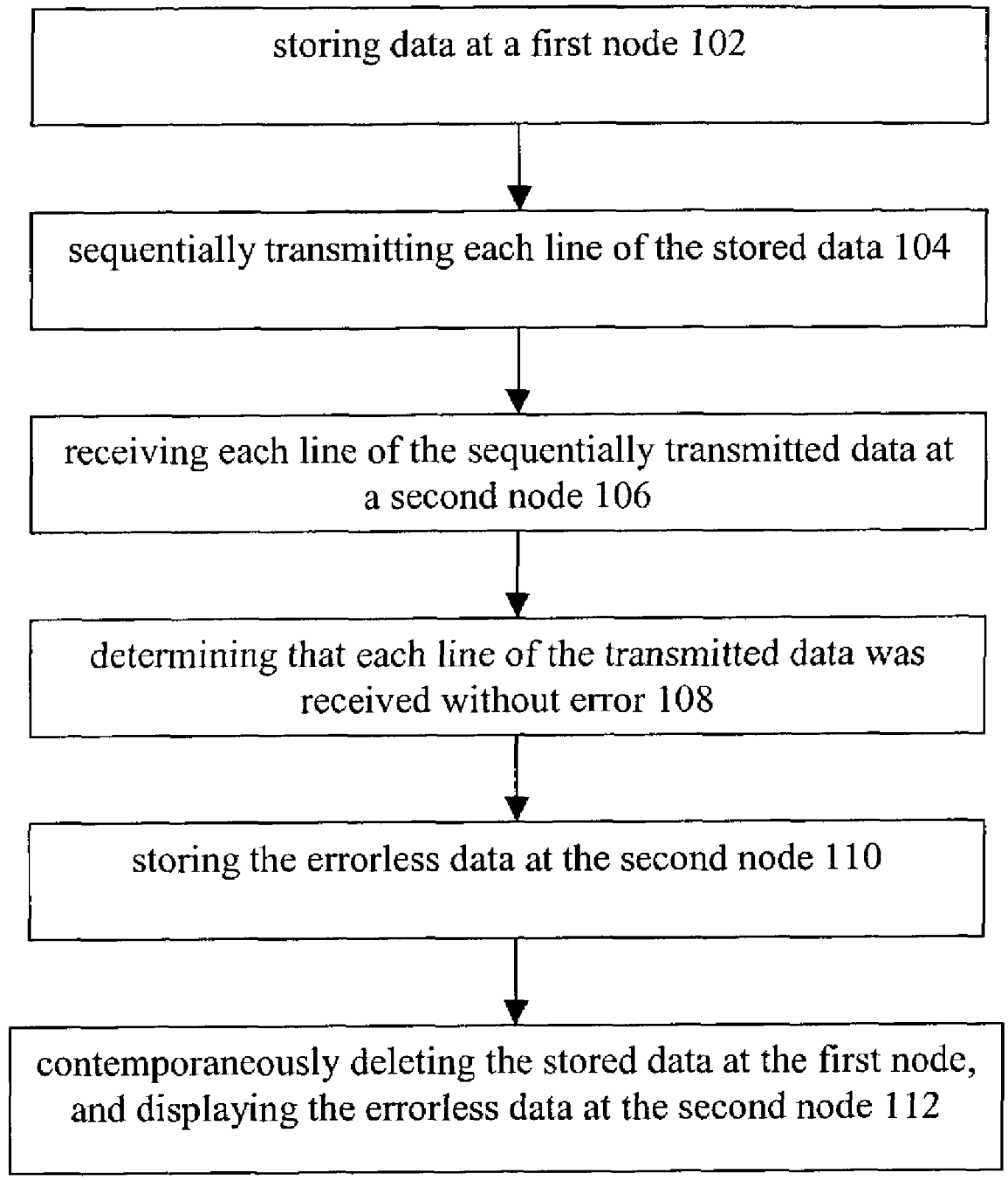
FIG. 7 illustrates a flow chart for performing certain instructions by a computer readable medium in accordance with an exemplary embodiment of the present invention.

Referring now to FIG. 7, instructions performed by a computer readable medium are presented. The computer readable medium may be a processor (not shown) or an entity (such as the sensor 36) in the camera 12 and/or the base unit 14, and the instructions may be stored in the camera sensor memory 16, the camera data buffer 18, the base unit data buffer 32, the base unit memory 34 and/or in another memory (not shown). The instructions performed by the computer readable medium include storing data at a first node at step 102, sequentially transmitting each line of the stored data at step 104, receiving each line of the sequentially transmitted data at a second node at step 106, determining that each line of the transmitted data was received without error at step 108, storing the errorless data at the second node at step 110, and contemporaneously deleting the stored data at the first node, and displaying the errorless data at the second node at step 112.

Figure 8:
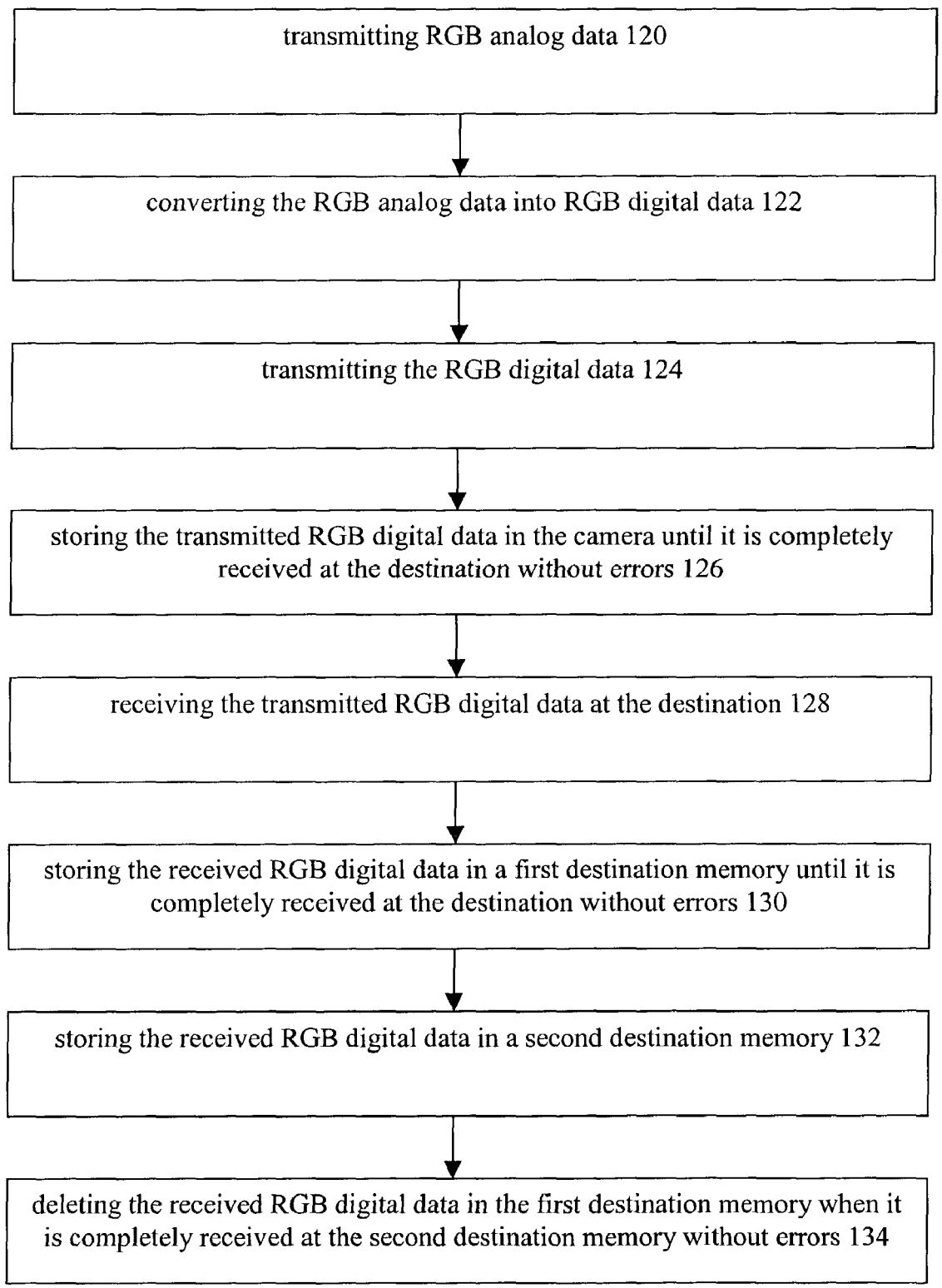
FIG. 8 illustrates a flow chart for video data transmission from a camera to a destination in accordance with an exemplary embodiment of the present invention.

Referring now to FIG. 8, a method for video data transmission from a camera to a destination is disclosed. The method begins at step 120 with the transmitting of RGB analog data. Converting the RGB analog data into RGB digital data and transmitting the RGB digital data occurs respectively at steps 122 and 124. The method proceeds at steps 126 and 128, respectively, with the storing of the transmitted RGB digital data in the camera until it is completely received at the destination without errors, and the receiving of the transmitted RGB digital data at the destination. Storing the received RGB digital data in a first destination memory until it is completely received at the destination without errors occurs at step 130 and storing the received RGB digital data in a second destination memory occurs at step 132. The method continues at step 134 with the deleting of the received RGB digital data in the first destination memory when it is completely received at the second destination memory without errors.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, a plurality of cameras 12 and base units 14 may be utilized with the present invention. Further, the camera physical transceiver 24 and the base unit physical transceiver 26 may be operably coupled to each other via other connections, including copper, fiber and wireless, if the transceivers were modified to accommodate such other connections. Also, if the camera sensor memory 16 is not a destructive read then the camera data buffer 18 may not be required. Still further, the average data rate, the data output, and the transmission time may be altered if different transceivers were used and/or if the resolution of the video differed. Additionally, the connection 25 may comprise an entity with dynamic characteristics thus altering the maximum travel time, the data transmission travel time, the acknowledgement time, the line time, and the processing time. Also, the system 10 may operate at a lesser or greater distance than 3000 feet which will alter the travel time and time for the system to start and process any transmissions. Further, the data transmission protocols may comprise different information and/or sizes of the information.

We claim:

1. A video transmission system comprising:
   a camera including:
   a sensor memory adapted to store video data having lines until each said line of the stored video data is sequentially transmitted;
   a data buffer adapted to receive and store a first said line of the sequentially transmitted video data until the line is completely received at a base unit memory without errors, wherein the data buffer is operably coupled to the sensor memory;
   a data port adapted to receive the first line from the data buffer and transmit the first line to a camera physical transceiver, wherein the data port is operably coupled to the data buffer;
   a controller adapted to control data flow between the camera and a base unit, wherein the controller is operably coupled to the data port; and
   the camera physical transceiver adapted to transfer the first line to a physical transceiver of the base unit, wherein the camera physical transceiver is operably coupled to the data port; and
   wherein the base unit includes:
   the base unit physical transceiver adapted to receive the transferred first line, wherein the base unit physical transceiver is operably coupled to the camera physical transceiver;
   a base unit data port adapted to receive the first line from the base unit physical transceiver and transmit the first line to a base unit data buffer, wherein the data port is operably coupled to the base unit physical transceiver;
   a controller adapted to control data flow between the base unit and the camera, wherein the controller is operably coupled to the data port;
   the base unit data buffer adapted to store the first line video data from the base unit data port until it is completely received at the base unit physical transceiver without errors, wherein the base unit data buffer is operably coupled to the base unit data port; and
   the base unit memory adapted to receive and sequentially store each said line of the transferred video data, wherein the base unit memory is operably coupled to the data buffer.

2. The video transmission system of claim 1 further comprising a camera sensor, wherein the video data is sequentially transmitted from the sensor memory in RGB color space format native to the camera sensor, and wherein the camera sensor comprises the sensor memory.

3. The video transmission system of claim 2 further comprising an A/D converter adapted to convert the video data from analog data to digital data, wherein the A/D converter interfaces to the sensor memory and the camera data buffer.

4. The video transmission system of claim 3 further comprising a programmable logic device (PLD) adapted to control timing signals of the camera sensor, wherein the timing signals are utilized to move the video data out of the camera sensor memory, through the A/D converter, and into the data buffer, and wherein the PLD interfaces to the A/D converter and the camera data buffer.

5. The video transmission system of claim 1, wherein the base unit physical transceiver is adapted to transmit an acknowledgement to the camera physical transceiver after each said line of the transferred video data is received without errors from the camera physical transceiver.

6. The video transmission system of claim 5, wherein the base unit controller is adapted to confirm, via the data port, that each said line of the transferred video data was received without errors at the base unit physical transceiver.

7. The video transmission system of claim 5, wherein the sensor memory is adapted to increment to a next said line of the video data to be sequentially transmitted when the acknowledgement is received by the camera controller.

8. The video transmission system of claim 5, wherein the camera data buffer is adapted to retransmit the line of the sequentially transmitted video data when the acknowledgement is not received by the camera controller within an amount of time.

9. The video transmission system of claim 8, wherein the camera data buffer includes:
an input multiplexer;
a first one line first-in-first-out (FIFO) memory;
a second one line FIFO memory; and
an output multiplexer, wherein the input multiplexer and the output multiplexer are operably coupled to the first one line FIFO memory and the second one line FIFO memory, wherein the first one line FIFO memory is adapted to receive and store the video data and wherein the second one line FIFO memory is adapted to store the line of the video data to be retransmitted.

10. The video transmission system of claim 1, wherein the data ports are further adapted to simultaneously transmit and receive video and non-video data.

11. The video transmission system of claim 1, wherein the physical transceivers are adapted to simultaneously transfer and receive video and non-video data.

12. A video transmission system comprising:
a camera including:
a camera memory adapted to store a frame of video data having lines, and delete a previous said line when a next said line of the frame is read, until each said line of the frame is transmitted to and received at a destination;
wherein the camera memory is adapted to read the next line of the frame when the previous line of the frame is received at the destination; and
wherein the next line of the frame is read upon receiving an acknowledgement of the previous line transmission; and
wherein the destination includes:
a destination memory adapted to store a last complete received said frame of the video data from the camera memory.

13. The video transmission system of claim 12 further comprising a display adapted to receive information from the camera memory.

14. A camera comprising:
a sensor memory adapted to store one of a plurality of frames having lines of video data until each said line of the one frame is transmitted to and received at a destination;
wherein the sensor memory is adapted to read a next said line of the one frame when a previous said line is received at the destination;
a data buffer adapted to receive the plurality of frames and store them until they are completely received at the destination without errors, wherein the data buffer is operably coupled to the sensor memory and a data port; and
a physical transceiver adapted to transmit the frames to the destination, wherein the physical transceiver is operably coupled to the data port.

15. The camera of claim 14, wherein the sensor memory is adapted to delete the previous said line when it is received at the destination.

16. The camera of claim 14, wherein the sensor memory is adapted to store a next said frame of the plurality of frames of video data when each said line of the one frame is received at the destination.

17. The camera of claim 14, wherein the data port is adapted to transmit and receive non-video data to and from the destination.

18. The camera of claim 14 further comprising:
a controller adapted to control a flow of data between the camera and the destination, wherein the controller is operably coupled to the data port; and
wherein the physical transceiver is adapted to receive the data from the destination.

19. A video transmission system comprising:
a camera including:
a sensor memory adapted to store previous video data and delete the stored previous video data having lines when each said line of the stored previous video data is sequentially transmitted;
a sensor adapted to sequentially transmit the previous video data in RGB color space format native to the camera sensor, wherein the camera sensor comprises the sensor memory;
a programmable logic device (PLD) adapted to convert the sequentially transmitted previous video data into YUV color space format and transmit the YUV data to a data buffer, wherein the PLD interfaces to the sensor memory and the data buffer;
wherein the data buffer is adapted to receive and store the YUV data until it is completely received at a base unit memory without errors, wherein the data buffer is operably coupled to the sensor memory; and
a camera physical transceiver adapted to transmit the stored YUV data to a base unit physical transceiver, wherein the camera physical transceiver is operably coupled to the data buffer via a data port; and
wherein the base unit includes:
the base unit physical transceiver adapted to receive the transmitted YUV data from the camera physical transceiver, wherein the base unit physical transceiver is operably coupled to the camera physical transceiver;
a data buffer adapted to store the received YUV data from the base unit physical transceiver until it is completely received at the base unit physical transceiver without errors, wherein the data buffer is operably coupled to the base unit physical transceiver via a data port; and the base unit memory adapted to sequentially store each line of the received YUV data, wherein the base unit memory is operably coupled to the data buffer.

20. The video transmission system of claim 19, wherein the camera data buffer is adapted to delete the YUV data when it is completely received at the base unit memory without errors.

21. A video transmission system comprising:
a camera including:
   a sensor memory adapted to store previous video data and delete the stored previous video data when each line of the stored previous video data is sequentially transmitted;
   a sensor adapted to sequentially transmit the previous video data as RGB analog data, wherein the camera sensor comprises the sensor memory;
   an A/D converter adapted to convert the RGB analog data into RGB digital data and transmit the RGB digital data to a data buffer, wherein the A/D converter interfaces to the sensor and the data buffer;
   wherein the data buffer is adapted to receive and store the RGB digital data until it is completely received at a base unit memory without errors, wherein the data buffer is operably coupled to the sensor memory; and
   a camera physical transceiver adapted to transmit the stored RGB digital data to a base unit physical transceiver, wherein the camera physical transceiver is operably coupled to the data buffer via a data port; and wherein the base unit includes:
   the base unit physical transceiver adapted to receive the transmitted RGB digital data from the camera physical transceiver, wherein the base unit physical transceiver is operably coupled to the camera physical transceiver;
   a data buffer adapted to store the received RGB digital data from the base unit physical transceiver until it is completely received at the base unit physical transceiver without errors, wherein the data buffer is operably coupled to the base unit physical transceiver via a data port; and
   the base unit memory adapted to sequentially store each line of the received RGB digital data, wherein the base unit memory is operably coupled to the data buffer.

22. The video transmission system of claim 21, wherein the camera data buffer is adapted to delete the RGB digital data when it is completely received at the base unit memory without errors.

* * * * *